(12) United States Patent
Chae et al.

(10) Patent No.: US 12,315,906 B2
(45) Date of Patent: May 27, 2025

(54) METHOD OF PREPARING NEGATIVE ELECTRODE

(71) Applicant: LG ENERGY SOLUTION, LTD., Seoul (KR)

(72) Inventors: Oh Byong Chae, Daejeon (KR); Ye Ri Kim, Daejeon (KR); Su Yeon Lee, Daejeon (KR); Seung Hae Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 658 days.

(21) Appl. No.: 17/770,239

(22) PCT Filed: Oct. 30, 2020

(86) PCT No.: PCT/KR2020/015078
§ 371 (c)(1),
(2) Date: Apr. 19, 2022

(87) PCT Pub. No.: WO2021/086132
PCT Pub. Date: May 6, 2021

(65) Prior Publication Data
US 2022/0359855 A1    Nov. 10, 2022

(30) Foreign Application Priority Data
Nov. 1, 2019  (KR) .................. 10-2019-0138873

(51) Int. Cl.
| H01M 8/04 | (2016.01) |
| H01M 4/04 | (2006.01) |
| H01M 4/66 | (2006.01) |
| H01M 8/04007 | (2016.01) |
| H01M 8/04014 | (2016.01) |
| H01M 8/04089 | (2016.01) |
| H01M 10/0569 | (2010.01) |
| H01M 4/02 | (2006.01) |

(52) U.S. Cl.
CPC ....... H01M 4/0416 (2013.01); H01M 4/0404 (2013.01); H01M 4/667 (2013.01); H01M 8/04014 (2013.01); H01M 8/04074 (2013.01); H01M 8/04089 (2013.01); H01M 10/0569 (2013.01); *H01M 2004/027* (2013.01)

(58) Field of Classification Search
CPC ......... H01M 8/04014; H01M 8/04074; H01M 8/04089
See application file for complete search history.

(56) References Cited

U.S. PATENT DOCUMENTS

| 5,595,837 A | 1/1997 | Olsen et al. |
| 5,753,388 A | 5/1998 | Koksbang et al. |
| 2013/0284988 A1 | 10/2013 | Satake et al. |
| 2013/0302688 A1 | 11/2013 | Takezawa |
| 2015/0017543 A1 | 1/2015 | Lee et al. |
| 2016/0181594 A1* | 6/2016 | Balogh ............... H01M 4/0471 156/247 |
| 2020/0058929 A1* | 2/2020 | Chae .................. H01M 10/0525 |
| 2020/0235419 A1 | 7/2020 | Chae et al. |
| 2020/0303722 A1 | 9/2020 | Chae et al. |
| 2020/0321612 A1 | 10/2020 | Chae et al. |
| 2020/0373553 A1 | 11/2020 | Chae et al. |
| 2021/0408517 A1* | 12/2021 | Bobel ................. H01M 4/0445 |
| 2022/0052307 A1* | 2/2022 | Rangasamy ........ H01M 4/1393 |
| 2023/0006186 A1* | 1/2023 | Lou ..................... H01M 4/1393 |

FOREIGN PATENT DOCUMENTS

| CN | 104584278 A | | 4/2015 | |
| CN | 107799721 A | | 3/2018 | |
| CN | 109994773 A | | 7/2019 | |
| CN | 110212183 A | * | 9/2019 | ........ H01M 10/0525 |
| CN | 110214387 A | | 9/2019 | |
| CN | 111864181 A | * | 10/2020 | ........ H01M 10/0525 |
| CN | 111900369 A | * | 11/2020 | ........ H01M 10/0525 |
| JP | 6-44958 A | | 2/1994 | |
| KR | 10-2015-0014877 A | | 2/2015 | |
| KR | 10-1771279 B1 | | 8/2017 | |
| KR | 10-2019-0083304 A | | 7/2019 | |

(Continued)

OTHER PUBLICATIONS

Extended European Search Report for European Application No. 20881012.7, dated Mar. 30, 2023.
Abe et al., "Effect of Prelithiation Process for Hard Carbon Negative Electrode on the Rate and Cycling Behaviors of Lithium-Ion Batteries", Batteries, 2018, vol. 4, No. 4, pp. 71, pp. 1-16.

(Continued)

*Primary Examiner* — Amanda C. Walke
(74) *Attorney, Agent, or Firm* — Birch, Stewart, Kolasch & Birch, LLP

(57) ABSTRACT

Disclosed is a method of preparing a negative electrode which includes the steps of: forming a cell by sequentially stacking a preliminary negative electrode, a separator, and a lithium metal, immersing the cell in an electrolyte solution comprising a lithium salt and a solvent; applying a current after the cell is immersed in the electrolyte solution containing the lithium salt and the solvent, separating the preliminary negative electrode from the cell after removing the cell immersed in the electrolyte solution from the electrolyte solution, washing the separated preliminary negative electrode, performing a first drying on the washed preliminary negative electrode at room temperature, and performing a second drying on the first dried preliminary negative electrode at a temperature ranging from 30° C. to 70° C. in a vacuum state.

15 Claims, No Drawings

(56) References Cited

FOREIGN PATENT DOCUMENTS

| KR | 10-2019-0090723 A | 8/2019 | | |
|---|---|---|---|---|
| KR | 10-2019-0101807 A | 9/2019 | | |
| KR | 10-2019-0106772 A | 9/2019 | | |
| KR | 20220025321 A | * 3/2022 | .......... | H01M 10/052 |
| WO | WO 2019/07089 A1 | 4/2019 | | |

OTHER PUBLICATIONS

International Search Report for PCT/KR2020/015078 (PCT/ISA/210) mailed on Feb. 9, 2021.

\* cited by examiner

METHOD OF PREPARING NEGATIVE ELECTRODE

TECHNICAL FIELD

CROSS-REFERENCE TO RELATED APPLICATIONS

This application claims priority from Korean Patent Application No. 10-2019-0138873, filed on Nov. 1, 2019, the disclosure of which is incorporated by reference herein.

TECHNICAL FIELD

The present invention relates to a method of preparing a negative electrode which may improve life characteristics of a battery by effectively removing moisture of the negative electrode subjected to pre-lithiation.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. Among these components, the negative electrode includes a current collector and a negative electrode active material layer which is on the current collector, wherein the negative electrode active material layer includes a negative electrode active material. In order to increase energy density of the negative electrode, various negative electrode active materials, such as silicon, have been used, but there is a limitation in that capacity of the battery is reduced and life characteristics are degraded due to high irreversible capacity.

In order to address this limitation, a pre-lithiation method has been introduced in which an irreversible site in the negative electrode is first filled with lithium. As the pre-lithiation method, there is a method in which lithium is intercalated into the negative electrode by impregnating a simple cell, in which the negative electrode, the separator, and lithium metal are sequentially bonded, in an electrolyte solution, and the lithium-intercalated negative electrode is separated from the simple cell and then used in a battery.

A drying process is performed in order to remove a solvent of the electrolyte solution in the pre-lithiated negative electrode, wherein, in this case, a large amount of moisture is inevitably absorbed by the negative electrode and a solid electrolyte interface (SEI) on a surface of the negative electrode. Thus, when the negative electrode containing the moisture is used in a battery, since an excessive amount of HF is generated in the electrolyte solution, dissolution of the positive electrode may be severe, resistance of the battery may also be increased, safety may be reduced due to gas generation, and life characteristics of the battery may be degraded.

Therefore, there is a need for a method of preparing a negative electrode which may effectively remove the moisture of the pre-lithiated negative electrode.

DISCLOSURE OF THE INVENTION

Technical Problem

An aspect of the present invention provides a method of preparing a negative electrode which may eliminate irreversible capacity of the negative electrode, may decrease resistance of a battery, and may improve safety and life characteristics.

Technical Solution

According to an aspect of the present invention, there is provided a method of preparing a negative electrode which includes the steps of: forming a cell by sequentially stacking a preliminary negative electrode, a separator, and a lithium metal; immersing the cell in an electrolyte solution comprising a lithium salt and a solvent; applying a current after the cell is immersed in the electrolyte solution containing the lithium salt and the solvent; separating the preliminary negative electrode from the cell after removing the cell immersed in the electrolyte solution from the electrolyte solution; washing the separated preliminary negative electrode; performing a first drying on the washed preliminary negative electrode at room temperature; and performing a second drying on the first dried preliminary negative electrode at a temperature ranging from 30° C. to 70° C. in a vacuum state.

According to another aspect of the present invention, there is provided a method of preparing a negative electrode which includes the steps of: forming a pre-lithiation structure by bonding a preliminary negative electrode and a lithium metal; immersing the pre-lithiation structure in an electrolyte solution comprising a lithium salt and a solvent; aging the pre-lithiation structure after the pre-lithiation structure is immersed in the electrolyte solution containing the lithium salt and the solvent; separating the preliminary negative electrode from the pre-lithiation structure after removing the pre-lithiation structure immersed in the electrolyte solution from the electrolyte solution; washing the separated preliminary negative electrode; performing a first drying on the washed preliminary negative electrode at room temperature; and performing a second drying on the first dried preliminary negative electrode at a temperature ranging from 30° C. to 70° C. in a vacuum state.

Advantageous Effects

According to the present invention, since pre-lithiation is performed, irreversible capacity of a negative electrode may be eliminated. Also, since moisture in the negative electrode and a solid electrolyte interface (SEI) formed on the negative electrode may be effectively removed, generation of HF in an electrolyte solution is suppressed, and thus, resistance of a battery may be reduced and safety and life characteristics of the battery may be improved.

Furthermore, since first drying performed at room temperature and second drying performed at a temperature of 30° C. to 70° C. are sequentially performed, a non-aqueous solvent and the moisture in the negative electrode may be sequentially removed, and, accordingly, a decrease in adhesion between negative electrode active material particles and between a negative electrode active material and a current collector may be suppressed to improve battery lifetime.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A method of preparing a negative electrode according to an embodiment of the present invention includes the steps of: forming a simple cell by sequentially stacking a preliminary negative electrode, a separator, and a lithium metal (S1-1); applying a current after the simple cell is immersed in an electrolyte solution containing a lithium salt and a solvent (S1-2); separating the preliminary negative electrode from the simple cell after removing the simple cell immersed in the electrolyte solution from the electrolyte solution (S1-3); washing the separated preliminary negative electrode (S1-4); performing first drying on the washed preliminary negative electrode at room temperature (S1-5); and performing second drying on the first dried preliminary negative electrode at a temperature of 30° C. to 70° C. in a vacuum state (S1-6).

In step S1-1, the preliminary negative electrode may include a current collector and a preliminary negative electrode active material layer disposed on the current collector.

The current collector is not particularly limited as long as it has conductivity without causing adverse chemical changes in a battery, and, for example, stainless steel, aluminum, nickel, titanium, fired carbon, or aluminum or stainless steel that is surface-treated with one of carbon, nickel, titanium, silver, or the like may be used. Also, the current collector may typically have a thickness of 3 μm to 500 μm, and microscopic irregularities may be formed on the surface of the current collector to improve the adhesion of the active material. The current collector, for example, may be used in various shapes such as that of a film, a sheet, a foil, a net, a porous body, a foam body, a non-woven fabric body, and the like.

The preliminary negative electrode active material layer may be disposed on the current collector. Specifically, the preliminary negative electrode active material layer may be disposed on one or both surfaces of the current collector.

The preliminary negative electrode active material layer may include a negative electrode active material.

A compound capable of reversibly intercalating and deintercalating lithium may be used as the negative electrode active material. Specific examples of the negative electrode active material may be a carbonaceous material such as hard carbon, soft carbon, artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SiO_2$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Specifically, the negative electrode active material may be at least one selected from the group consisting of a carbonaceous material, $SiO_x(0≤x≤2)$, $SnO_2$, a Si—C composite, and a Sn—C composite. Also, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

More specifically, the negative electrode active material may include at least one of $SiO_x(0≤x<2)$ and a carbon-based material. Particularly, $SiOx(0≤x<2)$ is advantageous in that it may improve capacity of the negative electrode, but it has a limitation in that it has low initial efficiency due to its large irreversible capacity. From this point of view, since the irreversible capacity of the negative electrode may be reduced when following the method of preparing a negative electrode according to the present invention, the initial efficiency may be maintained even if the $SiO_x(0≤x<2)$ is included in the negative electrode active material and the capacity of the negative electrode may be improved.

The preliminary negative electrode active material layer may further include a binder. The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

The negative electrode active material layer may further include a conductive agent. The conductive agent is not particularly limited as long as it has conductivity without causing adverse chemical changes in the battery, and, conductive materials, for example, graphite such as natural graphite and artificial graphite; carbon black such as acetylene black, Ketjen black, channel black, furnace black, lamp black, thermal black, and Denka black; conductive fibers such as carbon fibers or metal fibers; conductive tubes such as carbon nanotubes; fluorocarbon powder; metal powder such as aluminum powder, and nickel powder; conductive whiskers such as zinc oxide whiskers and potassium titanate whiskers; conductive metal oxide such as titanium oxide; or polyphenylene derivatives, may be used.

A loading amount of the preliminary negative electrode active material layer may be in a range of 1 mg/cm$^2$ to 20 mg/cm$^2$, for example, 5 mg/cm$^2$ to 10 mg/cm$^2$. When the above range is satisfied, application of large stress to the negative electrode in a pre-lithiation process may be suppressed and damage to the negative electrode may be minimized.

The separator separates the negative electrode and the lithium metal and provides a movement path of lithium ions, wherein any separator may be used as the separator without particular limitation as long as it is typically used in a secondary battery, and particularly, a separator having high moisture-retention ability for an electrolyte solution as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The lithium metal plays a role in supplying lithium to the preliminary negative electrode. The lithium metal may be in the form of an electrode formed of lithium.

The lithium metal may have a thickness of 10 μm to 200 μm, but the present invention is not necessarily limited thereto.

The preliminary negative electrode, the separator, and the lithium metal may be sequentially stacked, and a simple cell may be formed by this process. The simple cell may be composed of a plurality of preliminary negative electrodes, a plurality of separators, and a plurality of lithium metals, and the preliminary negative electrode and the lithium metal may be spaced apart by the separator.

In step S1-2, the simple cell may be immersed in an electrolyte solution.

The electrolyte solution may include an organic electrolyte solution or an inorganic electrolyte solution, but the present invention is not limited thereto.

Specifically, the electrolyte solution may include a non-aqueous organic solvent and a lithium salt.

As the non-aqueous organic solvent, for example, an aprotic solvent, such as N-methyl-2-pyrrolidone, propylene carbonate, ethylene carbonate, ethyl methyl carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used, and two or more thereof may be mixed and used.

Particularly, among the carbonate-based organic solvents, since ethylene carbonate and propylene carbonate, as cyclic carbonate, well dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

The lithium salt is a material that is readily soluble in the non-aqueous organic solvent, wherein, for example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The lithium salt may be included in an amount of 0.5 M to 3 M in the electrolyte solution, and may be specifically included in an amount of 0.7 M to 1.5 M. When the above range is satisfied, there is an advantage in that stable pre-lithiation may be achieved without significant resistance.

The application of the current plays a role in assisting movement of lithium ions from the lithium metal to the preliminary negative electrode.

An intensity of the current may be in a range of 0.1 mA/cm$^2$ to 10 mA/cm$^2$, and may specifically be in a range of 0.5 mA/cm$^2$ to 2 mA/cm$^2$. When the above range is satisfied, stable pre-lithiation is possible.

The preliminary negative electrode may be charged from a SOC of 5% to a SOC of 50%, for example, from a SOC of 10% to a SOC of 30% by the current applied. Herein, the expression "SOC (state of charge)" refers to a level of charge of a battery, wherein, specifically, the SOC of a fully charged battery means 100% SOC, and the SOC of a fully discharged battery means 0% SOC.

When the current is applied, some lithium ions are intercalated into the preliminary negative electrode, and a solid electrolyte interface (SEI) is formed on the preliminary negative electrode.

The step of applying the current (S1-2) may be performed while applying pressure to the simple cell. When the pressure is applied, since a gap between the preliminary negative electrode and the lithium metal may be kept small and constant, the pre-lithiation may be performed more stably and uniformly. The pressure may be in a range of 10 kPa to 3,500 kPa, and may specifically be in a range of 300 kPa to 2,000 kPa.

In step S1-3, the preliminary negative electrode is separated from the simple cell after removing the simple cell immersed in the electrolyte solution from the electrolyte solution.

In step S1-4, the separated preliminary negative electrode is washed. Dimethyl carbonate (DMC), diethyl carbonate (DEC), or ethyl methyl carbonate (EMC) may be used for the washing, and the electrolyte solution and lithium salt remaining on a surface of the preliminary negative electrode may be removed through the washing.

In step S1-5, the washed preliminary negative electrode may be subjected to first drying at room temperature. The room temperature may mean a temperature of 15° C. to 25° C.

The non-aqueous solvent of the electrolyte solution may be effectively removed through the first drying. If only the second drying to be described later is performed without the first drying, since the non-aqueous solvent and moisture are simultaneously rapidly removed by vacuum and high-temperature drying, adhesion between negative electrode active material particles and between the negative electrode active material and the current collector is reduced to easily generate a spaced-apart space, and, accordingly, the life characteristics of the battery may be degraded. Thus, in the present invention, there is a difference in that the non-aqueous solvent is first removed by performing the first drying at room temperature before the second drying, and moisture is then sequentially removed through the second drying. Accordingly, since the non-aqueous solvent and the moisture may be sequentially removed, the life characteristics of the battery may be maintained.

The first drying may be performed for 5 minutes to 2 hours, and may be specifically performed for 10 minutes to 30 minutes. When the above range is satisfied, the electrolyte solution may be sufficiently dried.

The first drying may be performed at normal pressure.

The first drying may be performed in a dry room. Specifically, the dry room may have a dew point of −80° C. to −30° C. Since the dry room is used, oxidation of the negative electrode due to moisture during the first drying may be prevented.

In step S1-6, the first dried preliminary negative electrode may be subjected to second drying in a vacuum state.

The second drying may be performed at a temperature of 30° C. to 70° C., may be specifically performed at a temperature of 40° C. to 60° C., and may be more specifically performed at a temperature of 45° C. to 55° C. When the second drying is performed at a temperature of less than 30° C., it is difficult to effectively remove moisture present in the preliminary negative electrode and the SEI formed on the preliminary negative electrode, and the moisture is likely to remain. When the second drying is performed at a temperature of more than 70° C., since the SEI formed in step S1-2 is destroyed, the life characteristics of the battery are degraded even if the moisture is effectively removed. Thus, since the drying is performed in a vacuum at an appropriate temperature of 30° C. to 70° C. in the present invention, the destruction of the SEI is prevented while effectively removing the moisture in the preliminary negative electrode and the SEI on the preliminary negative electrode, and thus, safety and life characteristics of the battery may be improved.

Since the second drying is performed in a vacuum state, the moisture may be effectively removed even at a low temperature, and thus, damage to the negative electrode due to high temperature may be prevented.

The second drying may be performed for 1 hour to 48 hours, and may be specifically performed for 5 hours to 15 hours. When the above range is satisfied, since the moisture in the negative electrode may be effectively removed, battery performance may be improved.

A method of preparing a negative electrode according to another embodiment of the present invention may include the steps of: forming a pre-lithiation structure by bonding a preliminary negative electrode and a lithium metal (S2-1); aging after the pre-lithiation structure is immersed in an electrolyte solution containing a lithium salt and a solvent (S2-2); separating the preliminary negative electrode from the pre-lithiation structure after removing the pre-lithiation structure immersed in the electrolyte solution from the electrolyte solution (S2-3); washing the separated preliminary negative electrode (S2-4); performing first drying on the washed preliminary negative electrode at room temperature (S2-5); and performing second drying on the first dried preliminary negative electrode at a temperature of 30° C. to 70° C. in a vacuum state (S2-6).

Since the preliminary negative electrode, the lithium metal, and the electrolyte solution are the same as those introduced in the above-described embodiment, descriptions thereof will be omitted.

In step S2-1, the preliminary negative electrode and the lithium metal may be bonded to be in contact with each other. Specifically, the lithium metal may be disposed on a preliminary negative active material layer of the preliminary negative electrode, and the pre-lithiation structure may be formed by this process.

In step S2-2, the pre-lithiation structure may be immersed in the electrolyte solution and then aged. Through this step, lithium ions may be transferred from the lithium metal and intercalated into the preliminary negative electrode, and an SEI may be formed at an interface between the preliminary negative electrode active material layer and the lithium metal. The aging refers to resting the pre-lithiation structure for a predetermined period of time in a state in which the pre-lithiation structure is immersed in the electrolyte solution. The aging may be performed for 0.01 hours to 10 hours, and may be specifically performed for 0.05 hours to 5 hours. When the above range is satisfied, a stable SEI may be formed.

In step S2-3, the pre-lithiation structure is removed from the electrolyte solution, and the preliminary negative electrode is separated from the pre-lithiation structure.

Since steps S2-4, S2-5, and S2-6 are the same as steps S1-4, S1-5, and S1-6 of the above-described embodiment, descriptions thereof will be omitted.

A negative electrode according to another embodiment of the present invention may be the negative electrode formed through the above-described embodiments.

A secondary battery according to another embodiment of the present invention may include a negative electrode, a positive electrode, a separator disposed between the positive electrode and the negative electrode, and an electrolyte, and the negative electrode is the same as the above-described negative electrode, that is, the negative electrode after the completion of the pre-lithiation. In other words, the negative electrode included in the secondary battery corresponds to the negative electrode prepared according to the method of preparing a negative electrode of the above-described embodiment. Thus, since the negative electrode has been described above, detailed descriptions thereof will be omitted.

The positive electrode may include a positive electrode collector and a positive electrode active material layer which is formed on the positive electrode collector and includes a positive electrode active material.

In the positive electrode, the positive electrode collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 μm to 500 μm and may have a surface with fine roughness to improve adhesion to the positive electrode active material. The positive electrode collector may be used in various shapes, for example, a film, a sheet, a foil, a net, a porous body, a foam body, a non-woven fabric body, and the like.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \leq c2 \leq 0.3$); lithium manganese composite oxide expressed by a chemical formula of $LiMn_{2-c3}M_{c3}O_2$ (where M is at least one selected from the group consisting of Co, Ni, Fe, chromium (Cr), zinc (Zn), and tantalum (Ta), and c3 satisfies $0.01 \leq c3 \leq 0.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode collector. Specific examples of the positive electrode binder may be polyvinylidene fluoride (PVDF), a polyvinylidene fluoride-hexafluoropropylene copolymer (PVDF-co-HEP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium. salt may be used as the metal salt, and the lithium salt is a material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLE AND COMPARATIVE EXAMPLES

Example 1-1

Preparation of Negative Electrode (1) Preparation of Preliminary Negative Electrode A negative electrode slurry was prepared by adding 92 wt % of a negative electrode active material (graphite:SiO=7:3 weight ratio), 3 wt % of Denka black (conductive agent), 3.5 wt % of SBR (binder), and 1.5 wt % of CMC (thickener) to water. Both surfaces of a copper current collector was coated with the above-prepared negative electrode slurry, dried, and rolled to prepare a preliminary negative electrode including a negative electrode active material layer (10 mg/cm$^2$).

(2) Pre-Llithiation Process

After the preliminary negative electrode was cut into a size of 34 mm×50 mm, a separator (poly propylene) and a lithium metal were sequentially stacked (the preliminary negative electrode and the lithium metal were spaced apart by the separator) to prepare a simple cell. Six preliminary negative electrodes and a plurality of lithium metals were disposed in the prepared simple cell, and the preliminary negative electrodes and the lithium metals were spaced apart by the separators. After the simple cell was immersed in an electrolyte solution (electrolyte solution in which 2 wt % of fluoroethylene carbonate (FEC) was added to a non-aqueous solvent, in which ethylene carbonate (EC) and ethyl methyl carbonate (EMC) were mixed in a volume ratio of 3:7, and 1 M LiPF$_6$ was dissolved) for 3 hours, pre-lithiation was performed on the preliminary negative electrode by electrochemical charging using a charger/discharger in a state in which the simple cell was pressurized with a pressure of 1,000 kPa using a pressurizing jig. In this case, an intensity of a current was set to 2 mA/cm$^2$, and the preliminary negative electrode was charged up to 25% (SOC 25%) of negative electrode charge capacity. Thereafter, after the preliminary negative electrode was separated from the simple cell, the preliminary negative electrode was washed with DMC.

Thereafter, the washed preliminary negative electrode was subjected to first drying in a dry room (dew point: −60° C.) for 20 minutes at room temperature (25° C.). After removing the non-aqueous solvent through the first drying, the preliminary negative electrode was introduced into a vacuum chamber and second drying was performed at 50° C. for 8 hours to remove moisture. Accordingly, a negative electrode was prepared.

Example 1-2

Preparation of Negative Electrode

A negative electrode was prepared in the same manner as in Example 1-1 except that the second drying was performed at 40° C.

Example 1-3

Preparation of Negative Electrode

A negative electrode was prepared in the same manner as in Example 1-1 except that the second drying was performed at 60° C.

Comparative Example 1-1

Preparation of Negative Electrode

A negative electrode was prepared in the same manner as in Example 1-1 except that the second drying was performed at 25° C.

Comparative Example 1-2

Preparation of Negative Electrode

A negative electrode was prepared in the same manner as in Example 1-1 except that the second drying was performed at 80° C.

Comparative Example 1-3

Preparation of Negative Electrode

A negative electrode was prepared in the same manner as in Example 1-1 except that the second drying was not performed.

Comparative Example 1-4

Preparation of Negative Electrode

A negative electrode was prepared in the same manner as in Example 1-1 except that the first drying was not performed.

Example 2-1

Preparation of Negative Electrode (1) Preparation of Preliminary Negative Electrode A negative electrode slurry was prepared by adding 92 wt % of a negative electrode active material (graphite:SiO=7:3 weight ratio), 3 wt % of Denka black (conductive agent), 3.5 wt % of SBR (binder), and 1.5 wt % of CMC (thickener) to water. Both surfaces of a copper current collector was coated with the above-prepared negative electrode slurry, dried, and rolled to prepare a preliminary negative electrode including a negative electrode active material layer (10 mg/cm$^2$).

(2) Pre-lithiation Process

A lithium metal having a thickness of 150 μm was disposed on a negative electrode active material layer of the preliminary negative electrode to prepare a pre-lithiation structure in which the negative electrode active material layer and the lithium metal were in contact with each other.

Thereafter, the pre-lithiation structure was immersed in an electrolyte solution (electrolyte solution in which 2 wt % of fluoroethylene carbonate (FEC) was added to a non-aqueous solvent, in which ethylene carbonate (EC) and ethyl methyl carbonate (EMC) were mixed in a volume ratio of 3:7, and 1 M $LiPF_6$ was dissolved), and was left standing (aged) for 0.5 hours. After the pre-lithiation structure after the completion of the aging was taken out from the electrolyte solution, the preliminary negative electrode was separated from the pre-lithiation structure. Thereafter, the preliminary negative electrode was washed with DMC.

The washed preliminary negative electrode was subjected to first drying in a dry room (dew point: −60° C.) for 20 minutes at room temperature (25° C.). After removing the non-aqueous solvent through the first drying, the preliminary negative electrode was introduced into a vacuum chamber and second drying was performed at 50° C. for 8 hours to remove moisture. Accordingly, a negative electrode was prepared.

Example 2-2

Preparation of Negative Electrode

A negative electrode was prepared in the same manner as in Example 2-1 except that the second drying was performed at 40° C.

Example 2-3

Preparation of Negative Electrode

A negative electrode was prepared in the same manner as in Example 2-1 except that the second drying was performed at 60° C.

Comparative Example 2-1

Preparation of Negative Electrode

A negative electrode was prepared in the same manner as in Example 2-1 except that the second drying was performed at 25° C.

Comparative Example 2-2

Preparation of Negative Electrode

A negative electrode was prepared in the same manner as in Example 2-1 except that the second drying was performed at 80° C.

Comparative Example 2-3

Preparation of Negative Electrode

A negative electrode was prepared in the same manner as in Example 2-1 except that the second drying was not performed.

Comparative Example 2-4

Preparation of Negative Electrode

A negative electrode was prepared in the same manner as in Example 2-1 except that the first drying was not performed.

EXPERIMENTAL EXAMPLE

Experimental Example 1

Measurement of Moisture Content in The Negative Electrode

For each of the negative electrodes of the examples and the comparative examples, a moisture content (ppm wt %) was measured by a Karl Fischer titrator (metrohm, 831 KF coulometer), and the moisture contents are presented in Table 1.

Experimental Example 2

Evaluation of Life Characteristics of Battery

Batteries were prepared as follows by using each of the negative electrodes of the examples and the comparative examples. An electrode assembly was prepared by stacking the negative electrode and a positive electrode (positive electrode active material: $LiNi_{0.8}Co_{0.1}Mn_{0.1}O_2$) with the separator (poly propylene) disposed therebetween. The electrode assembly was put in a pouch, and an electrolyte solution (electrolyte solution in which 2 wt % of fluoroethylene carbonate (FEC) was added to a non-aqueous solvent, in which ethylene carbonate (EC) and ethyl methyl carbonate (EMC) were mixed in a volume ratio of 3:7, and 1 M $LiPF_6$ was dissolved) was injected to prepare a pouch type secondary battery.

Charge/discharge reversibility test was performed on the secondary batteries using an electrochemical charger/discharger. The secondary batteries were charged by applying a current at a current density of 0.1 C-rate to a voltage of 4.2 V (vs. $Li/Li^+$) during charge and discharged at the same current density to a voltage of 2.5 V during discharge. When first cycle discharge capacity was set to 100%, $100^{th}$ cycle capacity retentions (%) are presented in Table 1 below.

TABLE 1

| | First drying temperature (° C.) | Second drying temperature (° C.) | Moisture content (ppm wt %) | Capacity retention after 100 cycles (%) |
|---|---|---|---|---|
| Example 1-1 | 25 | 50 | 310 | 94 |
| Example 1-2 | 25 | 40 | 400 | 91 |
| Example 1-3 | 25 | 60 | 290 | 93 |
| Comparative Example 1-1 | 25 | 25 | 650 | 85 |
| Comparative Example 1-2 | 25 | 80 | 240 | 79 |
| Comparative Example 1-3 | 25 | — | 1200 | 83 |
| Comparative Example 1-4 | — | 50 | 340 | 86 |
| Example 2-1 | 25 | 50 | 290 | 95 |
| Example 2-2 | 25 | 40 | 390 | 91 |
| Example 2-3 | 25 | 60 | 280 | 93 |
| Comparative Example 2-1 | 25 | 25 | 650 | 85 |
| Comparative Example 2-2 | 25 | 80 | 230 | 80 |
| Comparative Example 2-3 | 25 | — | 1200 | 83 |
| Comparative Example 2-4 | — | 50 | 320 | 87 |

With respect to the pre-lithiated negative electrode, an SEI formed on a surface of the negative electrode inevitably absorbed a large amount of moisture due to fine moisture remaining in the dry room even if the negative electrode was dried in the dry room from which moisture has been removed. Particularly, with respect to the pre-lithiated negative electrode, moisture was not only absorbed by the SEI, but a large amount of moisture was also absorbed by the negative electrode having high reactivity itself. With respect to Examples 1-1 to 1-3, since the secondary drying as well as the first drying was performed, it may be understood that the moisture was significantly reduced and the capacity retentions were high. Particularly, the reason for the high capacity retention is due to the fact that the moisture was not only effectively removed, but also, since the first drying and the second drying were sequentially performed to sequentially remove the non-aqueous solvent and the moisture, a rapid structural change of the negative electrode was prevented, and thus, adhesion between the negative electrode active material particles and between the negative electrode active material and the current collector may be maintained.

With respect to Comparative Example 1-1, since the second drying was performed at a low temperature, moisture was not effectively removed, and thus, it may be understood that battery resistance was increased to reduce the capacity retention of the battery. With respect to Comparative Example 1-2, since the second drying was performed at a very high temperature, the moisture content was small, but the capacity retention was low because an SEI was destroyed by the high temperature. With respect to Comparative Example 1-3, since the second drying was not performed, an excessive amount of moisture remained, and, as a result, it may be understood that battery resistance was increased to reduce the capacity retention of the battery. With respect to Comparative Example 1-4, only the second drying was performed without the first drying, and the moisture content was low, but, since the non-aqueous solvent and the moisture were rapidly removed together, a rapid structural change of the negative electrode occurred, and, accordingly, it may be understood that the capacity retention was low because adhesion between the negative electrode active material particles and between the negative electrode active material and the current collector was reduced.

Also, it may be understood that these results were the same even in a case where the pre-lithiation was performed in a negative electrode state, different from the method in which the pre-lithiation was performed by preparing the simple cell (See Examples 2-1 to 2-3 and Comparative Examples 2-1 to 2-4).

The invention claimed is:

1. A method of preparing a negative electrode, the method comprising steps of:
   forming a cell by sequentially stacking a preliminary negative electrode, a separator, and a lithium metal;
   immersing the cell in an electrolyte solution comprising a lithium salt and a solvent;
   applying a current after the cell is immersed in the electrolyte solution comprising the lithium salt and the solvent;
   separating the preliminary negative electrode from the cell after removing the cell immersed in the electrolyte solution from the electrolyte solution;
   washing the separated preliminary negative electrode;
   performing a first drying on the washed preliminary negative electrode at room temperature; and
   performing a second drying on the first dried preliminary negative electrode at a temperature ranging from 30° C. to 70° C. in a vacuum state.

2. The method of claim 1, wherein the first drying is performed for 5 minutes to 2 hours.

3. The method of claim 1, wherein the first drying is performed in a dry room.

4. The method of claim 1, wherein the second drying is performed for 1 hour to 48 hours.

5. The method of claim 1, wherein the preliminary negative electrode comprises a current collector and a preliminary negative electrode active material layer on the current collector, and
   a loading amount of the preliminary negative electrode active material layer is in a range of 1 mg/cm$^2$ to 20 mg/cm$^2$.

6. The method of claim 1, wherein an intensity of the current is in a range of 0.1 mA/cm$^2$ to 10 mA/cm$^2$.

7. The method of claim 1, wherein the preliminary negative electrode is charged from a state of charge of 5% to a state of charge of 50% by the current applied.

8. The method of claim 1, wherein the step of applying the current is performed while applying pressure to the cell.

9. The method of claim 8, wherein the pressure is in a range of 10 kPa to 3,500 kPa.

10. A method of preparing a negative electrode, the method comprising steps of:
    forming a pre-lithiation structure by bonding a preliminary negative electrode and a lithium metal;
    immersing the pre-lithiation structure in an electrolyte solution comprising a lithium salt and a solvent;
    aging the pre-lithiation structure after the pre-lithiation structure is immersed in the electrolyte solution comprising the lithium salt and the solvent;
    separating the preliminary negative electrode from the pre-lithiation structure after removing the pre-lithiation structure immersed in the electrolyte solution from the electrolyte solution;
    washing the separated preliminary negative electrode;
    performing a first drying on the washed preliminary negative electrode at room temperature; and
    performing a second drying on the first dried preliminary negative electrode at a temperature ranging from 30° C. to 70° C. in a vacuum state.

11. The method of claim 10, wherein the aging is performed for 0.01 hours to 10 hours.

12. The method of claim 10, wherein the first drying is performed for 5 minutes to 2 hours.

13. The method of claim 10, wherein the first drying is performed in a dry room.

14. The method of claim 10, wherein the second drying is performed for 1 hour to 48 hours.

15. The method of claim 10, wherein the preliminary negative electrode comprises a current collector and a preliminary negative electrode active material layer on the current collector, and
    a loading amount of the preliminary negative electrode active material layer is in a range of 1 mg/cm$^2$ to 20 mg/cm$^2$.

* * * * *